(12) United States Patent
Ashcraft et al.

(10) Patent No.: US 11,633,901 B2
(45) Date of Patent: Apr. 25, 2023

(54) THERMOPLASTIC SHEET HEATING APPLIANCE

(71) Applicants: Robert W. Ashcraft, El Dorado, CA (US); Robert B. Ayrest, Placerville, CA (US)

(72) Inventors: Robert W. Ashcraft, El Dorado, CA (US); Robert B. Ayrest, Placerville, CA (US)

( * ) Notice: Subject to any disclaimer, the term of this patent is extended or adjusted under 35 U.S.C. 154(b) by 506 days.

(21) Appl. No.: 16/152,216

(22) Filed: Oct. 4, 2018

(65) Prior Publication Data

US 2020/0108546 A1 Apr. 9, 2020

(51) Int. Cl.
*B29C 51/26* (2006.01)

(52) U.S. Cl.
CPC .................. *B29C 51/262* (2013.01)

(58) Field of Classification Search
CPC ..................... B29C 51/422; B29C 51/262
See application file for complete search history.

(56) References Cited

U.S. PATENT DOCUMENTS 5,025,137 A 6/1991 Ayrest

*Primary Examiner* — Larry W Thrower
(74) *Attorney, Agent, or Firm* — Howard Cohen

(57) ABSTRACT

An apparatus for heating of thermally deformable sheet material includes a frame consisting of a pair of end beams extending laterally and a pair of side rails secured longitudinally between the end beams in a rectangular arrangement The side rail channels are oriented with their longitudinal openings extending upwardly. A heating tray assembly extends laterally and includes a pair of quick-release cam clamps disposed at opposed ends thereof to engage the respective side rail in a slidable, releasable fashion, so that the tray may be installed/removed at any location and clamped at that location. A sheet support assembly includes similar cam clamps at each end, and may be installed/removed at any location and translated/clamped at that location to maintain planar support of a workpiece.

13 Claims, 4 Drawing Sheets

THERMOPLASTIC SHEET HEATING APPLIANCE

CROSS-REFERENCE TO RELATED APPLICATIONS

Not applicable

FEDERALLY SPONSORED RESEARCH

Not applicable.

SEQUENCE LISTING, ETC ON CD

Not applicable.

BACKGROUND OF THE INVENTION

Field of the Invention

This invention relates to an apparatus for selective zonal heating of thermoplastic sheet material.

Description of Related Art

It is a common practice in the production of plastic products to form thermoplastic sheet material into utilitarian objects by heating the material in selective areas to soften the material, then deforming the softened portion to reorientate the rigid portions thereof. The state of the art of an apparatus for heating thermoplastic sheet material is described in U.S. Pat. No. 5,025,137 issued to Robert Ayrest. That patent describes a knock-down rectangular frame construction having opposed sides that join opposed end beams. The opposed sides each include a slide tube member extending between the end beams. There is at least one tray assembly spanning the opposed sides and joined thereto, with cylindrical couplers engaging the slide tubes to enable adjusting the position of the tray assembly between the end beams. The tray assembly supports a heating rod that is selectively connected to an electrical power source to heat the rod and the plastic sheet portion that is exposed to the heating rod. There is also at least one work support assembly spanning the slide tubes and provided with a laterally extending surface disposed to engage one edge portion of a workpiece, and a stop member extending upwardly from the laterally extending surface to engage the perimeter of the edge portion to stop and locate the workpiece with respect to the other components set up on the apparatus.

In this prior art apparatus, the various components assembled to the slide tubes may be positioned (slidably) on the slide tubes and locked in position using thumb screws that engage the slide tube. It is possible that the rotational movement of the thumb screws engaging the slide tubes may shift the tray or work support assembly as it is being immobilized, resulting in the potential for altered alignments of the components and quality control issues.

Moreover, the prior art apparatus is assembled, in effect, as a plurality of trays and workpiece support assemblies that are joined with their cylindrical couplers disposed concentrically about a pair of tubes and stacked in a fixed order. In order to add or remove any of these active components, it is necessary to disassembly the entire stack by removing one of the end beams to release the cylindrical couplers from the ends of the slide tubes. This task may be unduly time consuming for production work.

BRIEF SUMMARY OF THE INVENTION

The present invention generally comprises an apparatus for selective zonal heating of thermally deformable sheet material. It includes a rectangular frame consisting of a pair of end beams in parallel, spaced apart disposition, and a pair of side beams, also in parallel, spaced apart orientation and extending between the end beams to define a precisely rectangular assembly. A pair of side rails is secured between the end beams, each side rail disposed adjacent to a respective one of the side beams. The side rails may be comprised of a standard structural channel product, such as Unistrut™ or the like. The frame is adapted to be supported horizontally, and the side rail channels are oriented with their longitudinal openings extending upwardly.

The apparatus includes at least one heating tray assembly that is disposed to extend laterally parallel to the end beams and supported by the pair of side rails. The heating tray includes a rectangular channel member extending with its opening extending upwardly and laterally to contain an electrically heated rod that extends substantially the entire lateral extent of the channel. (The heating rod forms no independent part of this invention.) At each end of the heating tray assembly a lever-operated, quick-release cam clamp is disposed to engage the respective side rail in a slidable, releasable fashion. The tray may be positioned to extend laterally at any location in the frame assembly and clamped at that location using the cam clamps. The cam clamps include alignment features that assure the heating tray assembly is oriented perfectly orthogonally with respect to the side rails.

Moreover, the cam clamps each include a threaded rod that extends through the end of the heating tray assembly to threadably engage a channel nut residing within the side rail and retained within the flanges at either side of the upper opening of the side rail. The threaded rods may be unscrewed from the channel nuts, enabling the ends of the tray assembly to be disengaged from the side rails and released from the frame assembly. As a result, the heating tray assembly may be removed or joined to the frame assembly at will, and/or slidably positioned to any location along the side rails.

The alignment feature includes an alignment plate interposed between the end of the tray assembly and the adjacent side rail. The alignment plate includes two parallel grooves that are precision stamped or machined to extend longitudinally and are disposed to engage the flanged edges of the upwardly opening side rail. The alignment plate is secured to the bottom surface of the end of the tray assembly to engage the side rail and require that the flanged edges of the side rail ride in the grooves and enforce rectilinear alignment of the tray assembly with the side rails.

The apparatus also includes at least one sheet support assembly that is disposed to extend laterally parallel to the end beams and supported by the pair of side rails. The sheet support assembly includes a rectangular channel member extending laterally and having a smooth planar upper surface. At each end of the sheet support assembly a lever-operated cam clamp is disposed, similar to the heating tray assemblies, to engage the respective side rail in a slidable, quick-release fashion. The sheet support assembly is available to be positioned wherever needed on the frame assembly to provide support to maintain planar disposition of a workpiece.

A further feature of the apparatus includes at least one stop plate assembly secured to the sheet support assembly. The stop plate comprises a long, narrow rigid plate extending laterally and secured to a lateral side of the sheet support assembly by a plurality of screws extending therefrom through vertical slots in the plate. The slots enable the plate to be slidably moved vertically from a recessed position in which the upper edge of the plate is below the upper surface of the sheet support assembly, to an extended position in which the upper edge protrudes upwardly from the upper surface of the support assembly to engage an edge of a workpiece to locate the workpiece in a positive fashion. Thus the support assembly serves dual functions of support of the workpiece in the vertical direction and location of the workpiece in the lateral plane.

Stop plate assemblies may also be secured to the outer vertical surfaces of the end beams of the frame assembly to provide workpiece location and alignment, as required by the individual job.

The upper surface of the sheet support assembly is disposed in a generally horizontal plane that also contains the upper surfaces of the heating tray, the end beams, and the side beams. Thus a sheet workpiece may be supported on the sheet heating apparatus and, if necessary, allowed to overhang the apparatus at any side or end to achieve the desired heating zone placement.

DETAILED DESCRIPTION OF THE INVENTION

Figure 2:
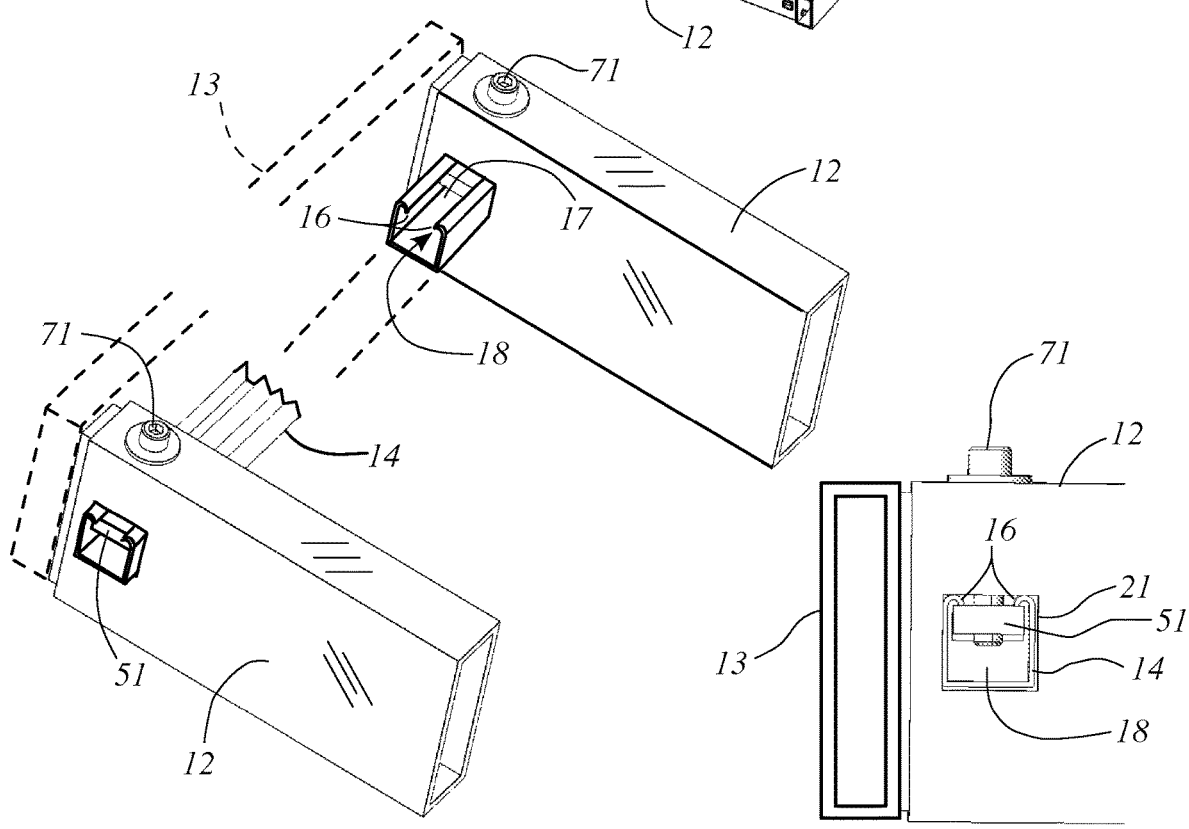
FIG. 2 is a fragmentary perspective view of the assembly of the rectangular frame and side rails of the present invention.
Figure 3:
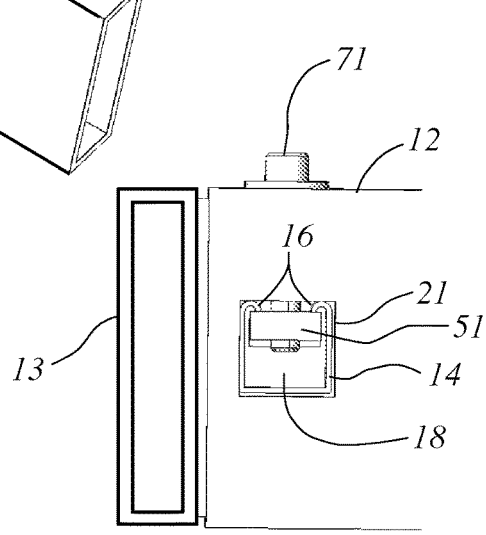
FIG. 3 is an enlarged detail view taken about line 3-3 of FIG. 1.

The present invention generally comprises an apparatus for selective zonal heating of thermally deformable sheet material. With regard to FIGS. 1-3, the apparatus includes a rectangular frame assembly 11 consisting of a pair of end beams 12 in parallel, spaced apart disposition, and a pair of side beams 13, also in parallel, spaced apart orientation and secured between the end beams 12 to define a precisely rectangular assembly. At least one of the side beams is provided with a measuring scale 15 displayed thereon to aid in positioning the components of the apparatus described below.

A pair of side rails 14 is secured between the end beams 12, each side rail 14 disposed adjacent to a respective one of the side beams. The side rails 14 may be comprised of a standard structural channel product, including a rectangular channel with a longitudinal cavity 18 having opposed flanges 16 extending inwardly into the opening 17 of the channel cavity 18. One such product is Unistrut™, though others are commercially available. The frame 11 is adapted to be supported horizontally, and the side rails are oriented with their longitudinal openings 17 extending upwardly.

The end beams 12 both comprise box rail members having opposed sides that are disposed in precise rectangular alignment. At both ends of both end beams precision cut rectangular openings 21 are formed to receive a respective end of one of the side rails 14 in a close tolerance fit. It may be appreciated that the openings 21 are formed in both opposed side walls of each end beam 12, and are located exactly so that the side rail extending therethough is oriented precisely orthogonally with respect to the end beam 12.

Figure 4:
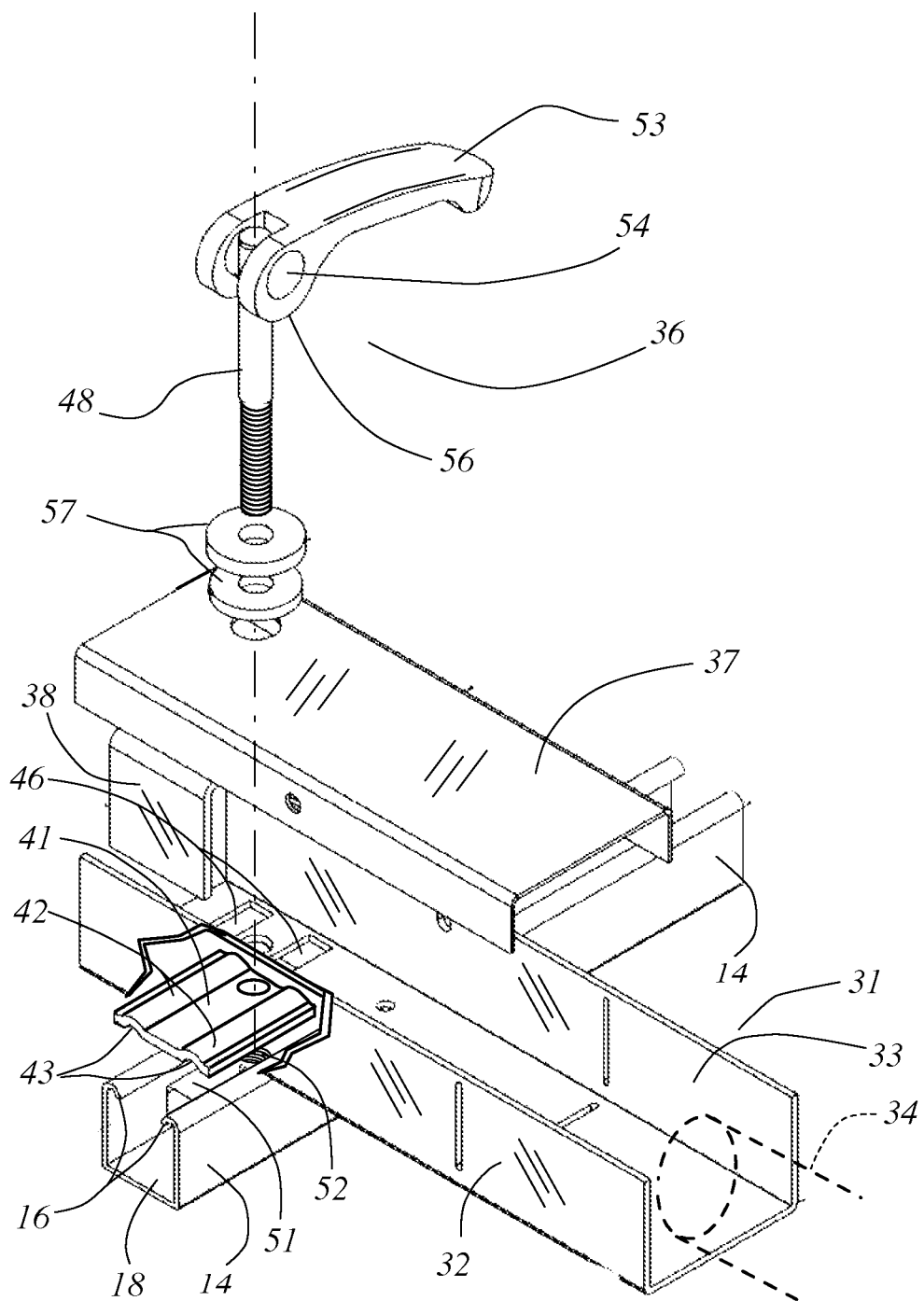
FIG. 4 is an exploded fragmentary view taken about line 4-4 of FIG. 1.
Figure 7:
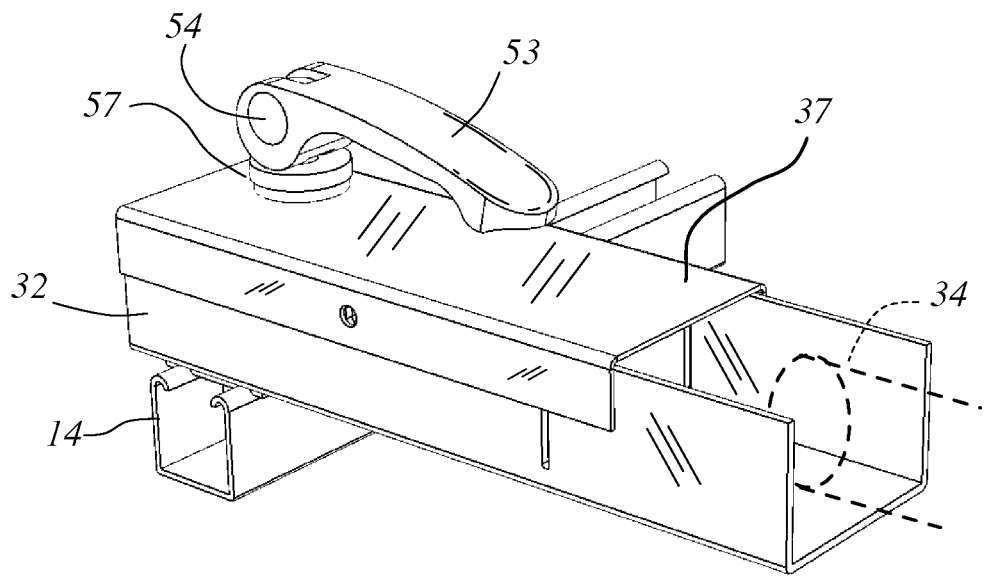
FIG. 7 is a detailed cutaway view of one end of a heating tray assembly of the invention, shown with the quick-release clamp in the clamped disposition.

The apparatus further includes at least one heating tray assembly 31 that is disposed to extend laterally parallel to the end beams 12 and supported by the pair of side rails 14. With particular reference to FIG. 4, the heating tray assembly 31 includes a rectangular channel member 32 extending with its opening 33 extending upwardly and laterally to contain an electrically heated rod 34 that extends substantially the entire lateral extent of the channel. (The heating rod forms no independent part of this invention.) At each end of the heating tray assembly a lever-operated, quick-release cam clamp assembly 36 is disposed to engage the respective side rail 14 in a slidable, releasable fashion. The clamp assembly includes a cap 37 comprised of a shallow, inverted channel piece that is dimensioned to fit closely over an end portion of the channel member 32, as shown best in FIG. 7. A lock support 38, comprised of a short channel section in inverted U-configuration and disposed within the channel 32, is provided to vertically reinforce the assembly in the portion that is generally aligned with the side rail 14 therebelow.

An alignment plate 41 is disposed between the side rail 14 and the bottom surface of the end of the channel member 32. The alignment plate is precision stamped (or otherwise formed) to incorporate a pair of parallel ridges 42 extending longitudinally and upwardly therefrom, with like-formed corresponding grooves 43 formed in the bottom surface of the plate. The grooves 43 are precisely spaced apart to engage the flanged edges 16 of the side rail 14 in a longitudinally slidable, laterally fixed relationship. The bottom surface of the end of the channel member 32 is provided with a pair of longitudinally extending slots 46 that are dimensioned to engage the ridges 42 therein in close fit and secure the alignment plate 41 to the overlying channel member 32 in both the longitudinal and lateral directions. Thus the alignment plate 41 secures the tray assembly 31 to the side rail 14 in a longitudinally slidable, laterally fixed relationship, assuring perfect alignment of the heating tray assembly 31 with respect to the frame assembly 11.

The cam clamp assembly 36 further includes a threaded rod 48 that extends through aligned holes in the cover 37, lock support 38, channel member 32, and alignment plate 41 to the interior cavity 18 of the side rail 14. A channel nut 51 is disposed within the cavity 18 and has a lateral dimension sufficient to engage the flanges 16 at either side of the upper opening of the side rail, and to prevent rotation of the nut in the channel cavity. A threaded hole 52 of the channel nut engages the threaded rod 48. A cam lever handle 53 is joined to the outer end of the rod 48 by a transverse pivot pin 54, and the handle 53 includes camming surfaces 56 impinging on washers 57 that bear on the cover 37.

Figure 5A:
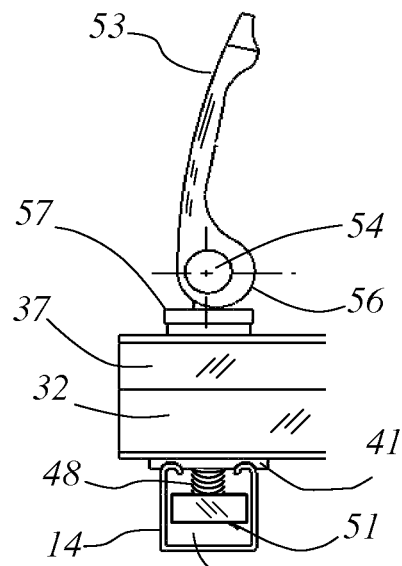
FIG. 5A is a detailed end elevation of the quick-release cam clamp engaged in the side rail and in a released disposition to permit movement along the side rail.
Figure 5B:
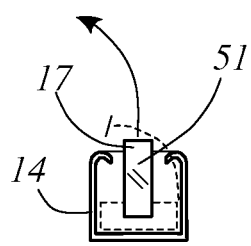
FIG. 5B is a similar end view showing removal of the channel nut.
Figure 6:
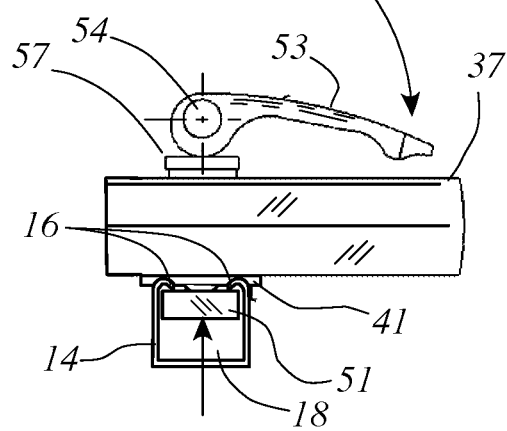
FIG. 6 is a detailed end elevation as in FIG. 5, showing the quick-release cam clamp in the clamped disposition to immobilize the assembly along the side rail.

The action of the cam lever handle 53 is well-known in the prior art: When the handle 53 is rotated upwardly as in FIG. 5, the camming surface 56 has a minimal radial displacement from the pivot axis of pin 54 and the rod 48 depends downwardly sufficiently to create slack space between the channel nut 51 and the channel flanges 16. When the handle 53 is rotated downwardly (clockwise as shown in FIG. 6), the portion of the camming surface 56 bearing on the washer assembly 57 has a greater radial displacement from the axis of pin 54, so that the rod 48 is drawn upwardly, as shown in FIG. 6. The channel nut is displaced upwardly to impinge on the opposed flanges 16 of side rail 14, exerting a strong clamping action on the flanges 16 and drawing together the flanges 16 with the alignment plate 41, and the ridges 42 with the slots 46 to form an immobilized assembly. Conversely, raising the lever handle 53, as shown in FIG. 5A, loosens the clamping action and enables the assembly to be slidably repositioned along the side rail 14. The threaded rod enables vertical adjustment of the clamping action.

In addition, an important aspect of the clamping assembly 36 is that it enables removal of the heating tray assembly 31 without necessitating removal of any other device secured to the side rails 14. The handle 53 may be employed to rotate the threaded rod 48 and unscrew the rod 48 completely from the channel nut 51. This enables the ends of the tray assembly to be disengaged from the side rails and released from the frame assembly. As a result, the heating tray assembly may be removed or joined to the frame assembly at will, and/or slidably positioned to any location along the side rails. Note also, with reference for example to FIG. 5B, that the channel nuts 51 have a height sufficiently small to enable any channel nut 51 to be removed from the channel by rotating the nut 90° about its longitudinal axis and lifting it out through the upper opening 17 of the side rail. Thus heating tray assemblies may be removed entirely and/or installed at any location along the side rails.

Returning to FIGS. 2 and 3, each end of each side rail 14 extends through the aligned openings 21 of the box rail end beam 12. A cap screw 71 extends through a hole in the upper surface of the beam 12 and through the upper opening 17 of the side rail 14 to engage a channel nut 51, substantially as described previously. The cap screw 71 is tightened to force the channel nut 51 against the flanges 16 and exert a strong clamping action wherewith to secure the side rails with respect to the end beams 12.

Figure 1:
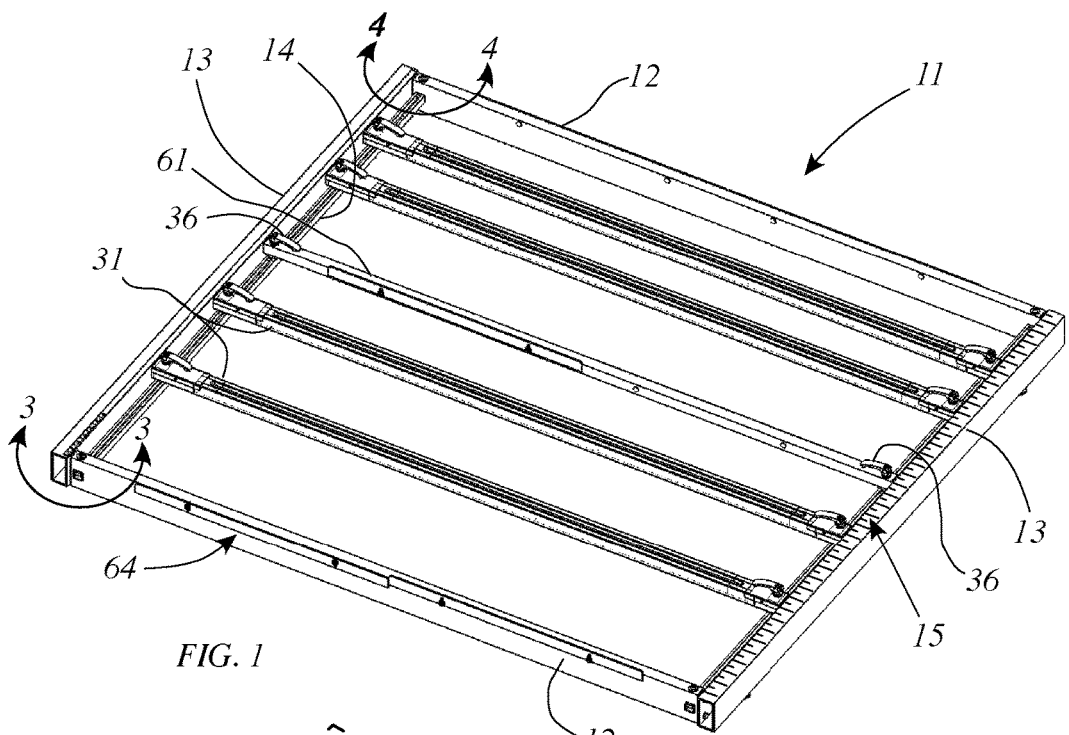
FIG. 1 is a perspective view of an exemplary configuration of the apparatus for zonal heating of heat-deformable sheet material of the present invention.
Figure 8:
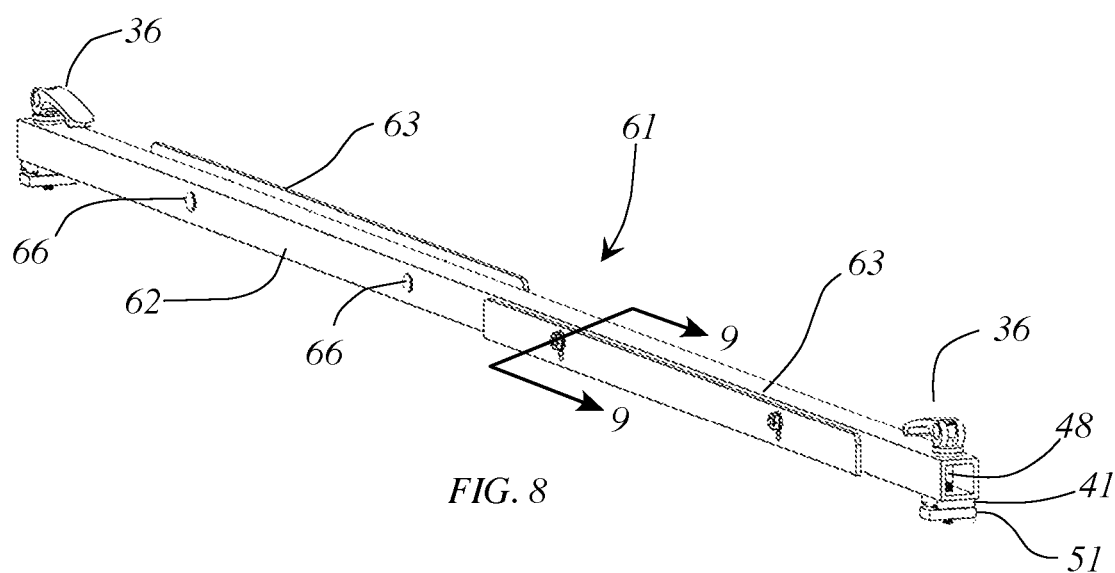
FIG. 8 is a perspective view of the sheet support assembly of the invention, shown with the stop plates in the extended disposition.
Figure 9:
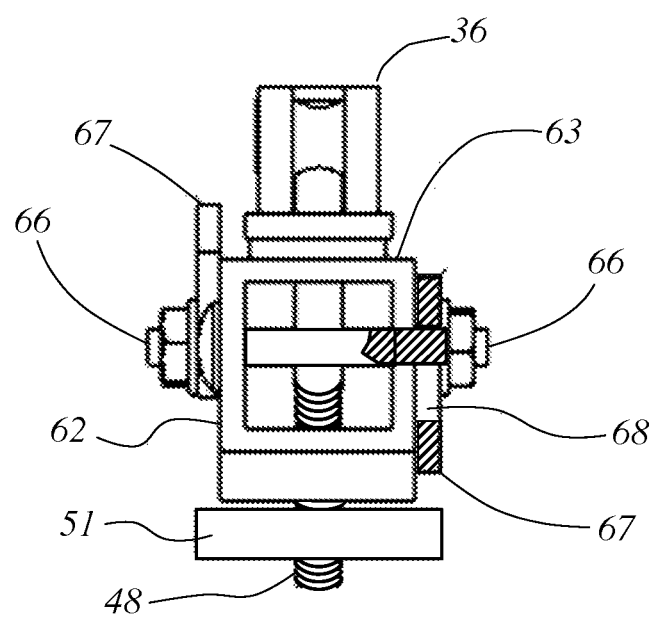
FIG. 9 is an enlarged end view of the stop plate mounting assembly, taken along line 9-9 of FIG. 8.

With reference to FIGS. 1, 8, and 9, the apparatus 11 also includes at least one sheet support assembly 61 that is disposed to extend laterally parallel to the end beams and supported by the pair of side rails. The sheet support assembly 61 includes a box rail channel member 62 extending laterally and having a smooth planar upper surface 63. Note that the surface 63 is substantially coplanar with the upper surfaces of the end beams 12, side beams 13, and cover components 37 of the heating tray assemblies. At each end of the sheet support assembly 61 a cam clamp assembly 36 is disposed, corresponding in components and function to the clamp assemblies 36 of the heating tray assemblies as described previously. The clamp assemblies 36 engage the respective side rails 14 in a slidable, quick-release fashion so that the sheet support assembly 61 may be installed and positioned/repositioned as described above wherever needed on the frame assembly 11 to provide support to maintain planar disposition of a workpiece.

In addition, the sheet support assemblies 61 are preferably provided with at least one stop plate assembly 64 secured to the sheet support assembly. With regard to FIG. 9, a pair of screw fasteners 66 extend longitudinally through the rail 62 and are spaced apart laterally therealong. A stop plate 67, comprising a long, narrow rigid plate extends laterally and abuts a vertical side of the rail 62 with the screw fasteners 66 extending through vertical slots 68 in the plate. The slots 68 enable the plate 67 to be slidably moved vertically from a recessed position in which the upper edge of the plate 67 is below the upper surface 63 of the box rail 62 (shown on the right in FIG. 9), to an extended position in which the upper edge protrudes upwardly from the upper surface 63 to engage an edge of a workpiece to locate the workpiece in a positive-stop fashion. Thus the support assembly 61 serves dual functions of support of the workpiece in the vertical direction and location of the workpiece in the lateral plane.

The apparatus 11 may further include at least one stop plate assembly 64 secured to the outer vertical surfaces of the end beams 12 of the frame assembly 11, as shown in FIG. 1. These stop plate assemblies provide workpiece location and alignment, as required by the individual job, and may provide a base for engaging one edge of the workpiece. As noted above, the stop plates may be retracted and be unengaged with the workpiece supported on the apparatus.

To summarize the advantages of the apparatus 11, both the heating tray assemblies and the sheet support assemblies 61 may be slidably positioned and clamped wherever needed, and they may be installed or removed as needed without altering the position or placement or assembly of any other components secured to the apparatus. The alignment plate assemblies of the cam clamps assure that the heating trays and sheet support assemblies are orthogonally related to the rectangular frame. The upper surfaces of all major components are aligned in a common plane to enable support of large or irregular sheets that may overhang the frame assembly.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. An apparatus for heating a thermally deformable sheet workpiece, comprising:
   a pair of parallel end beams extending laterally and spaced apart and joined by a pair of parallel side rails extending longitudinally therebetween and joined thereto in a rectangular assembly;
   a heating tray assembly extending laterally to support a thermally deformable sheet workpiece in vertically adjacent relationship and including a heating element to raise the temperature of said workpiece adjacent thereto to a deformable temperature;
   a pair of clamp assemblies, each disposed at an end of said heating tray assembly and disposed to engage one of said side rails in selective clamping fashion to secure said heating tray assembly at any selected longitudinal position along said side rails;

said pair of clamp assemblies further including release means for removably securing said clamp assemblies in said side rails to enable installation/removal of said heating tray assembly at any longitudinal location along said side rails;

said side rails each comprising a first rectangular channel component having a first channel cavity with a longitudinal opening oriented generally upwardly, and flange members extending each toward the other along said longitudinal opening, said clamp assemblies each including a channel nut disposed in said first channel cavity and retained therein by said flange members.

2. The apparatus of claim 1, wherein each clamp assembly includes a threaded rod having an inner end extending through one end of said heating tray assembly to engage said channel nut and secure said clamp assembly to said side rail.

3. The apparatus of claim 2, wherein each clamp assembly includes a cam lever handle joined to an outer end of said threaded rod to translate said threaded rod along its axis and releasably clamp said channel nut to said flange members of said side rail.

4. The apparatus of claim 3, wherein each clamp assembly further includes an alignment plate disposed between each of said side rails and each end of said heating tray assembly, said alignment plate including a pair of parallel grooves spaced apart and dimensioned to engage said flange members of said side rail in a longitudinally translatable, laterally fixed relationship.

5. The apparatus of claim 4, wherein said alignment plate includes a pair of ridges formed in complementary correspondence to said pair of grooves, and said each end of said heating tray assembly includes a pair of slots disposed to engage said pair of ridges in a longitudinally fixed, laterally fixed relationship.

6. The apparatus of claim 1, further including a sheet support assembly for supporting said workpiece on the apparatus, including a second rectangular channel component extending laterally and including an upper surface aligned with upper surface said end beams, and a further pair of clamp assemblies, each disposed at an end of said second rectangular channel component and disposed to engage one of said side rails in selective clamping fashion to secure said second rectangular channel component at any selected longitudinal position along said side rails.

7. The apparatus of claim 6, wherein all of said clamp assemblies each include a threaded rod having an inner end extending through one end thereof to engage said channel nut and secure said clamp assembly to said side rail.

8. The apparatus of claim 7, wherein all of said clamp assemblies each include a cam lever handle joined to an outer end of said threaded rod to translate said threaded rod along its axis and releasably clamp said channel nut to said flange members of said side rail.

9. The apparatus of claim 6, further including at least one stop plate assembly secured to said second rectangular channel component, including a rigid plate extending laterally along said second rectangular channel component, and set screw means for securing said plate in a position variable from a first, retracted position in which said plate is disposed vertically below said upper surface of said second rectangular channel, to a second, extended position in which a portion of said plate extends vertically above said upper surface of said second rectangular channel to engage said workpiece in a positive locating fashion.

10. The apparatus of claim 1, further including at least one stop plate assembly secured to said pair of end beams, including a rigid plate extending laterally along at least one of said end beams, and set screw means for securing said plate in a position variable from a first, retracted position in which said plate is disposed vertically below an upper surface of said end beam, to a second, extended position in in which a portion of said plate extends vertically above said upper surface of said end beam to engage said workpiece in a positive locating fashion.

11. The apparatus of claim 1, wherein each end beam comprises a box rail, and each box rail has opposed ends, each end having a pair of precision-cut openings in opposed surfaces thereof and dimensioned to receive a respective end of one of said side rails and to orient said side rail orthogonally with respect to said end beam.

12. The apparatus of claim 11, wherein said side rails each comprise a first rectangular channel component having a first channel cavity with a longitudinal opening oriented generally upwardly, and flange members extending each toward the other along said longitudinal opening, and a channel nut disposed in said first channel cavity and retained therein by said flange members, and a threaded fastener extending through said end beam to engage said channel nut and translate said channel nut against said flange components in rigid fashion.

13. The apparatus of claim 1, further including a pair of side beams extending adjacent to said side rails between said end beams, said side beams and end beams having upper surfaces that are substantially coplanar.

\* \* \* \* \*